United States Patent

Robinson

[11] Patent Number: 5,539,574
[45] Date of Patent: Jul. 23, 1996

[54] OPTICAL ISOLATOR WITH FABRY-PEROT RIPPLE REDUCTION

[75] Inventor: Kevin C. Robinson, Upper Milford Township, Pa.

[73] Assignee: AT&T Corp., Murray Hill, N.J.

[21] Appl. No.: 361,258

[22] Filed: Dec. 21, 1994

[51] Int. Cl.$^6$ .............................. G02B 5/30; G02B 27/28
[52] U.S. Cl. ........................ 359/484; 359/494; 359/499; 372/703
[58] Field of Search ............................... 359/281, 282, 359/484, 494, 495, 497, 499, 580, 589; 372/703; 385/11

[56] References Cited

U.S. PATENT DOCUMENTS

| | | | |
|---|---|---|---|
| 4,239,329 | 12/1980 | Matsumoto | 385/33 |
| 4,375,910 | 3/1983 | Seki | 359/484 |
| 4,548,478 | 10/1985 | Shirasaki | 359/484 |
| 5,033,830 | 7/1991 | Jameson | 359/484 |
| 5,052,786 | 10/1991 | Schulz | 359/484 |
| 5,208,876 | 5/1993 | Pan | 385/11 |
| 5,305,137 | 4/1994 | Ohkawara | 359/484 |
| 5,377,040 | 12/1994 | Naganuma | 359/497 |
| 5,428,477 | 6/1995 | Siroki | 359/487 |

FOREIGN PATENT DOCUMENTS

| | | | |
|---|---|---|---|
| 0159245 | 12/1979 | Japan | 359/484 |
| 0045219 | 3/1986 | Japan | 359/484 |
| 0083523 | 3/1990 | Japan | 359/484 |

*Primary Examiner*—Ricky D. Shafer
*Attorney, Agent, or Firm*—Richard D. Laumann; John A. Caccuro

[57] ABSTRACT

An optical isolator obtains reduced ripple due to Fabry-Perot reflections by using a polarization mode dispersion compensation element with first and second antireflection coatings designed to minimize reflections for first and second polarizations for first and second wavelengths.

3 Claims, 1 Drawing Sheet

OPTICAL ISOLATOR WITH FABRY-PEROT RIPPLE REDUCTION

TECHNICAL FIELD

This invention relates generally to the field of optical isolators and particularly to the field of optical isolators designed to reduce Fabry-Perot ripple reduction.

BACKGROUND OF THE INVENTION

Optical communications system have developed to a level of great sophistication and now include many elements in addition to the light source and photodetector optically coupled to each other by means of an optical fiber. Many of these elements have reflecting surfaces, and it has been found that the reflected radiation may have adverse effects on system operation. To prevent propagation of the unwanted reflected radiation, optical isolators have been developed. Optical isolators function as one way valves by permitting radiation to propagate in only one direction.

The operation of an exemplary optical isolator is easily explained. The optical isolator takes an incoming beam having arbitrary polarization and splits the incoming beam into two beams having orthogonal polarizations which will be referred to as o and e. The two polarizations take non-reciprocal paths through the optical isolator which depend on the direction of propagation of the beam. The paths in the forward propagation direction have low loss and the paths in the reverse propagation direction have high loss. The two beams, commonly referred to as the ordinary and the extraordinary beams, with orthogonal polarizations travel through the non-reciprocal portions of the optical isolator at different velocities and with consequently different path lengths. The different velocities thereby introduce some polarization mode dispersion. This dispersion is undesirable and is reduced by a polarization mode dispersion compensation element, commonly referred to by the acronym PMDCE, which reduces the polarization mode dispersion by equalizing the optical path length for both polarizations through the isolator. The PMDCE is a birefringent plate that accomplishes this equalization by presenting an optical path length which, for either beam, is the same as that of the orthogonal polarization in the non-reciprocal part of the isolator. The plate uses antireflection coatings on both major surfaces, which are parallel to each other, to reduce insertion loss. The PMDCE is placed approximately transverse to the direction of beam propagation. The entire package is often referred to as an optical isolator with the term isolator subassembly used for the non-reciprocal part of the isolator.

In a long distance optical communications system, there are typically many optical isolators. Careful measurement of the reflectivity of the optical isolators showed some residual reflectivity, and this reflectivity caused Fabry-Perot ripple in the isolator passband. There is a possibility that the ripples in individual optical isolators may line up and cause a loss at a given wavelength.

SUMMARY OF INVENTION

According to an exemplary embodiment of this invention, an optical isolator has an isolator subassembly and a polarization mode dispersion compensation element (PMDCE) having two parallel major surfaces with first and second antireflection coatings. First and second polarizations travel though the isolator subassembly at different velocities, and the first and second antireflection coatings minimize reflections from the PMDCE for the first and second polarizations, respectively. In a preferred embodiment, the PMDCE comprises titanium dioxide having the futile structure. In a further preferred embodiment, the anti reflection coatings are multilayer coatings.

Figure 1:
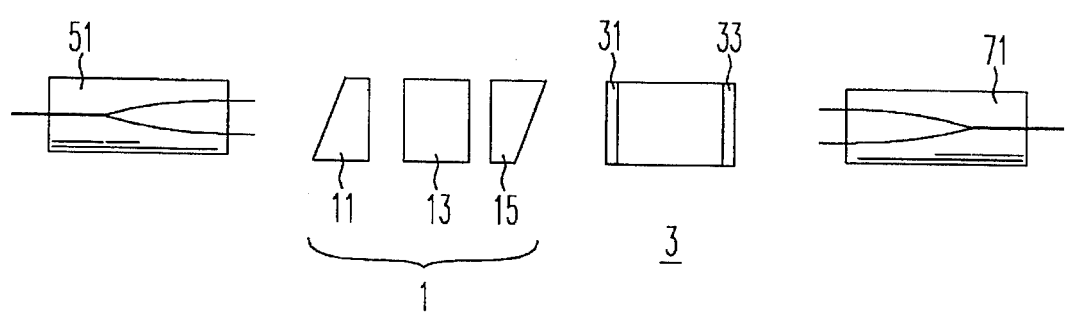
FIG. 1 is a schematic depiction of an optical isolator according to this invention.

For reasons of clarity, the elements depicted are not drawn to scale.

DETAILED DESCRIPTION

The invention will be described by reference to an exemplary embodiment. Before this embodiment is discussed, a brief explanation will be given of how the source of the ripple described was found. It is believed that this explanation will enable the invention to be better understood.

Before the ripple could be eliminated, the source of the ripple had to be found. Finding the source was not straight forward as there were many possible sources for the ripple that had to be considered. The optical isolator passband was examined when the optical isolator was illuminated with amplified spontaneous emission (ASE). A ripple was clearly evident, but there was no envelope present. This was believed significant because both polarizations are present in ASE with equal intensity. The two polarizations should have independent ripples with different periods due to the different refractive indices associated with the two polarizations. Many possible sources for the ripple were investigated and discarded, and the possible source that ultimately lead to substantial reduction in the ripple was the fact that the coatings present on the major surfaces of the PMDCE had a preferred polarization.

Theoretical calculations showed that if quarter wave coatings were applied to the PMDCE such that reflection for one polarization, say, o, was 0.25 percent and was 0.0 percent for the other polarization, e, there would be no envelope on the ripple. This was the behavior actually observed; however, the polarization favored by the quarter wave coatings still had to be determined to further show that this was indeed the source of the ripple. It was determined that the temperature coefficient of refractive index change differed for the o and e beams. Measurements performed with temperature variations showed that the ripple was caused by the o-polarization.

This result suggested that the antireflection coatings should be asymmetric with one coating matched for one polarization and the other coating matched for the other polarization. It was found that such asymmetric coatings greatly reduced the ripple. The optical isolator with reduced ripple is advantageously used in systems. With both polarizations present and having an independent period, alignment of the resonances between optical isolaters become more difficult and system performance is less likely to be adversely affected by the ripple.

FIG. 1 is a schematic representation of a cross section of an optical isolator according to this invention. Depicted are isolator subassembly 1 and polarization mode dispersion compensation element 3. Isolator subassembly 1 has three components 11, 13, and 15. Element 3 has first and second antireflection coatings 31 and 33, respectively, on opposed major surfaces.

The isolator subassembly separates an input beam, shown coming from collimator 51, having arbitrary polarization into two beams having orthogonal polarizations; that is, first and second polarizations. The isolator subassembly forces the two polarizations, commonly termed o and e as previously mentioned, to take non-reciprocal paths through the isolator subassembly depending upon the direction of propagation with low loss in the forward direction and high loss in the reverse direction. A second collimator 71 then receives the beam.

The details of isolator subassembly 1 which has the desired characteristics are well known to those skilled in the art and need not be described in detail. The elements depicted are formed from a birefringent material; titanium dioxide having the rutile structure is an exemplary choice. The shapes of the elements are generally as depicted; precise shapes will be readily determined by those skilled in the art. The collimators 51 and 71 are also well known to those skilled in the art and need not be described in detail.

PMDCE 3 reduces the dispersion introduced by isolator subassembly 1 by equalizing the optical path length of the beams that propagate through the isolator subassembly 1. The PMDCE is well known to those skilled in the art and will be readily fabricated. The first and second antireflection coatings 31 and 33 on opposed major surfaces are designed to have low reflectivity for the first and second polarizations, respectively. The coatings are typically multilayer coatings formed from one high refractive index material and one low refractive index material and will be readily made by those skilled in the art. The coatings are applied to a birefringent material such as the rutile structure titanium dioxide previously mentioned. The optical path lengths for the orthogonal polarizations through PMDCE 3 are desirably complementary to the optical path lengths through isolator subassembly 1 to insure complete polarization mode dispersion compensation.

Long distance optical communications systems frequently use radiation having wavelengths near either 1.3 um or near 1.5 um. The precise wavelength that is used will likely depend on system considerations and the radiation source used. Given knowledge of the wavelength used, those skilled in the art will readily fabricate the two antireflection coatings.

Variations in the embodiment discussed will be readily apparent to those skilled in the art. For example, materials other than titanium dioxide may be used, and the materials may have structures other than the rutile structure.

I claim:

1. An optical isolator comprising:

an isolator subassembly being adapted to decompose an incoming beam into first and second orthogonal polarizations; and a polarization mode dispersion compensation element having two parallel major surfaces, said surfaces having first and second antireflection coatings, respectively, said first antireflection coating arranged to minimize reflection of the first orthogonal polarization and said second antireflection coating arranged to minimize reflection of the second orthogonal polarization.

2. An optical isolator as recited in claim 1 in which said polarization mode dispersion compensation element comprises titanium dioxide having a rutile structure.

3. An optical isolator as recited in claim 1 in which said antireflection coatings are multilayer coatings.

\* \* \* \* \*